Oct. 11, 1938.   W. H. WENSTROM   2,132,549
CAMERA CASE
Filed July 30, 1937
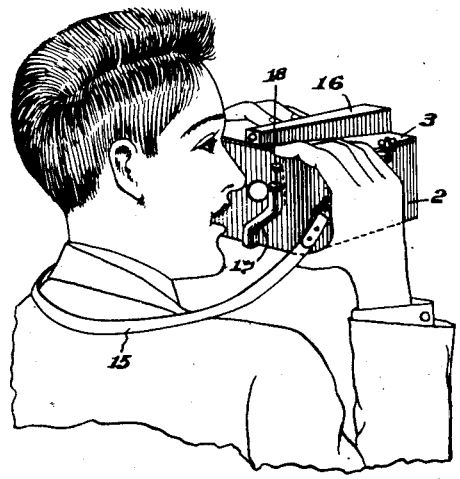
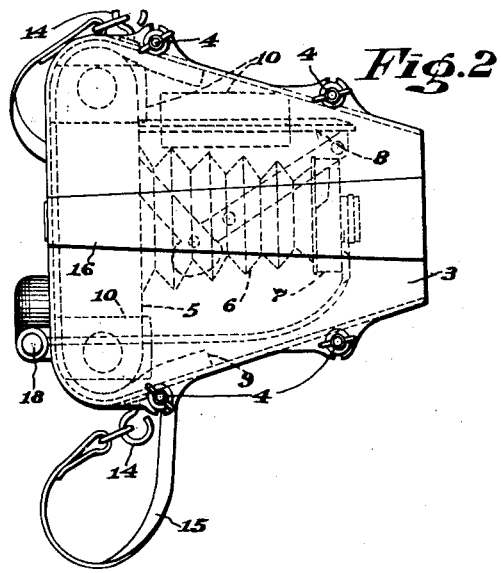
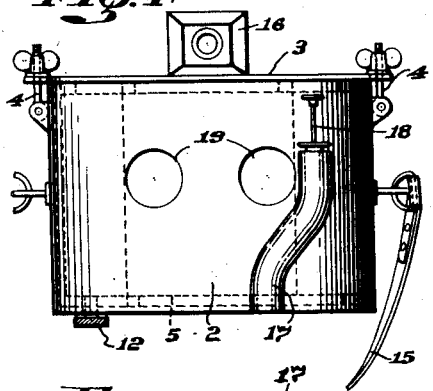
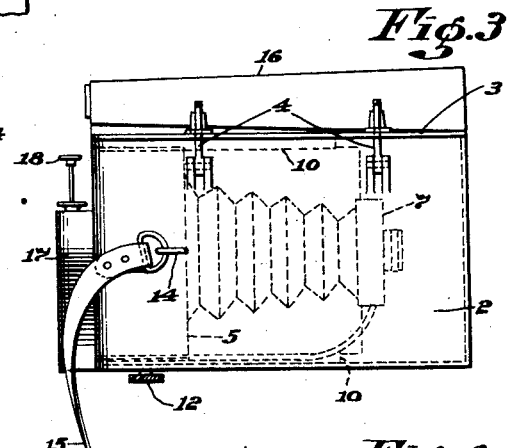
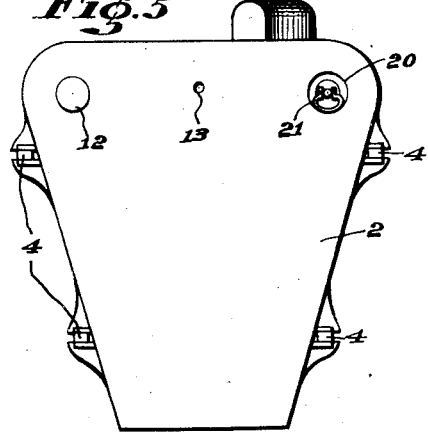
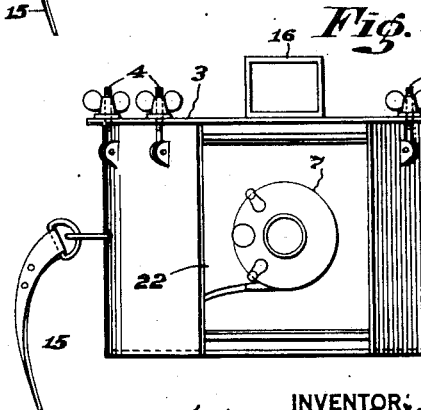
INVENTOR:
William H. Wenstrom
BY
his ATTORNEY.

Patented Oct. 11, 1938

2,132,549

UNITED STATES PATENT OFFICE 2,132,549

CAMERA CASE

William H. Wenstrom, New Haven, Conn.

Application July 30, 1937, Serial No. 156,533

8 Claims. (Cl. 95—32)

This invention relates to cameras and is more especially concerned with those of the smaller forms, such as "pocket cameras."

Usually cameras of this class are of the folding type. In using them it is necessary to open the camera and generally, also, to pull out the lens mounting and lock it in its open position. If the finder also is of the folding type, it is necessary to release it or to move it into its operative position. Also when a color filter or other supplementary lens is used, as in most modern photography, it must be removed from its case and attached to the opened camera. If a sunshade is used, it also must be attached.

All of these operations necessitate the expenditure of time, and this fact greatly limits the usefulness of the camera and very frequently makes it impossible to obtain pictures which could be taken if these preliminary or preparatory operations could be eliminated.

The present invention deals especially with the problem presented by these conditions. It aims to provide means for making a camera instantly and completely available for use, while at the same time effectually protecting the camera from damage. It is also an important object of the invention to protect the bellows and other parts of the camera from air blasts when taking pictures from an open airplane.

The nature of the invention will be readily understood from the following description when read in connection with the accompanying drawing, and the novel features will be particularly pointed out in the appended claims.

In the drawing,

Figure 1 is a perspective view of a camera case embodying this invention and showing the manner in which it may conveniently be used;

Fig. 2 is a plan view of the case shown in Fig. 1;

Figs. 3 and 4 are side and rear views, respectively, of said casing; and

Figs. 5 and 6 are bottom and front views, respectively, of the case.

As shown in the drawing, the invention provides a rigid metal case adapted to completely enclose and protect a camera. This case includes a body portion 2 and a cover 3 which is securely but releasably fastened to the body portion by means of several swing bolts 4. Since the particular case shown is designed to be used with a camera of the folding type, it is provided with a relatively large rear end to receive the camera body 5, Figs. 2 and 3, and it tapers as it extends forwardly so as to accommodate the bellows 6, lens mounting 7, and the hinged cover 8 when the camera is in its fully opened or extended condition. It is secured releasably in the camera case by means of the thumb screw 12, Figs. 3, 4 and 5, which extends through an aperture in the bottom of the case and is threaded into the tripod socket in the camera body. Sometimes this socket is located in the central part of said body instead of at one end of it, as in the construction shown, and a second hole 13, Fig. 5, or other suitable holes, preferably are provided in the bottom of the case to accommodate such a condition. Strips of felt, sponge rubber or other cushioning material 9 may extend around the back and ends of the camera body 5, while additional members 10—10 of such material may be placed above and below it, to aid in holding the camera snugly within the case.

Preferably both the body 2 and cover 3 of the case are made of some light weight but strong metal, such as aluminum, or some aluminum alloy, so that the weight which they add to the camera is not important. For many purposes the case may be made of Bakelite or equvalent material. The body 2 may be equipped with hooks, or equivalent devices, such as those shown at 14, by means of which a sling strap 15 may be secured to the case. It is also constructed for the convenient operation of the various accessories which necessarily are used with the camera. These include a finder 16 which preferably is of the telescope type and is secured permanently to or forms part of the cover 3, the lens elements, cross hairs, or the like, being enclosed in, and protected by, the rigid tube 16.

The cable release for the shutter is led from the lens mounting 7 under the camera and into a curved conduit 17 at the back of the case, the plunger 18 being mounted at the upper end of this conduit where it is very conveniently positioned for operation by the user, as will be evident from an inspection of Fig. 1.

At the back of the case 2 holes 19—19 are provided, one or both of which will be aligned with the window or windows at the back of the camera through which the exposure number on the film is seen. Also, the bottom of the case is provided with a hole 20, Fig. 5, or other suitable holes, through which access may be had conveniently to the film winding handle or thumb piece 21.

Preferably the front end 22, Fig. 6, of the case is left permanently open so that any necessity for the operation of a door, cover, or the like, is avoided. This opening is made of sufficient dimensions to permit the operator to reach in and adjust the shutter timer and the diaphragm, or to move the lens mounting backward and forward for focusing purposes, in the event that the camera is of a type requiring this operation.

The dimensions, however, should be such that the lens is set well back from the opening so that any danger of injury to it or to adjacent parts of the camera, due to their striking some external object, is practically negligible. Also, this portion of the case acts as a sunshade for the lens, its inside being preferably painted black.

It is contemplated that in using a camera mounted in a case of this type, the sling strap 15 will be worn around the user's neck, as shown in Fig. 1, with the case 2 suspended from it. In this position the camera is ready for instant use, no opening of the camera or the case, nor manipulation of the finder or other parts, nor addition of color filters, being necessary. Thus the fact that the camera is available for instant use is a great convenience to aviators, sportsmen, naturalists, automobilists, and others. For aerial photography, in particular, this case protects the lens and bellows of a folding camera from the slipstream of an open airplane, which would otherwise quickly damage them. The case is of such a nature that it effectually protects the camera from injury, even when the entire asembly is used roughly and subjected to the throwing around which necessarily occurs in an automobile, aeroplane, boat, or the like. After the exposure has been made the apparatus may be dropped or tossed into a convenient part of the car or other vehicle, no care being required to set it down carefully, or to fold up the camera. Usually before laying it aside, however, the winding device 21 is operated to wind the film far enough to bring a new exposure into position.

While I have herein shown and described a typical embodiment of my invention, it will be understood that the invention may be embodied in other forms without departing from the spirit or scope thereof.

Having thus described my invention, what I desire to claim as new is:

1. An article of the character described, comprising a rigid case open at one end and adapted to enclose a folding camera with the latter open and ready for use, said case being adapted to protect the camera on all sides and to encase it approximately completely except at said end, and means for fastening said camera securely in said case with the lens of the camera in its operative position but spaced inwardly from and facing said open end of the case, whereby said case supports said camera in readiness for instant use while affording substantially complete protection for it both during such use and when it is not in use.

2. An article according to preceding claim 1, including an enclosed finder for said camera mounted in an exposed position on said case.

3. An article according to preceding claim 1, including a finder of the telescope type mounted on said case in cooperative relationship to the camera, said case being constructed to enclose and protect said finder.

4. An article according to preceding claim 1, in which said case is provided with a window through which the exposure number of the camera may be observed, and is also provided with an aperture through which the film winding handle on the camera is exposed for operation.

5. An article of the character described, comprising a rigid case open at its front end, a folding camera mounted in said case with the lens thereof facing said end, said case being adapted to enclose said camera approximately completely except at said end with the camera in its open condition and ready for use, a screw projecting through said case and threaded into the tripod socket in the camera for securing the same in place, cushioning means in said case protecting the body of the camera, said case including a readily releasable portion for permitting the removal and replacement of the camera, said case and said fastening means cooperating to support said camera in readiness for instant use with the lens spaced inwardly from said open end of the case sufficiently to be protected by the case.

6. An article of the character described, comprising a rigid case open at its front end, a folding camera mounted in said case with the lens thereof facing said end, said case being adapted to enclose said camera approximately completely except at said end with the camera in its open condition and ready for use, means for fastening said camera in said case with its lens in position for picture taking but spaced inwardly from said open end of the case sufficiently to be protected by the case; and a finder for said camera mounted in an exposed position above said case.

7. An article according to preceding claim 6, in combination with an operating member connected with the shutter of said camera to actuate it, and mounted in a readily accessible position on said case.

8. An article of the character described, comprising a rigid case open at its front end and adapted to receive and enclose a folding camera, said case being relatively wide at the rearward end thereof to receive the body of the camera and tapering toward said open end, and means for fastening said camera securely but releasably in the case with the lens of the camera in its operative position and facing said open end but spaced inwardly therefrom sufficiently to protect the lens, the opening in said end being relatively small but large enough to permit access to said lens and to afford ample admission of light to said lens.

WILLIAM H. WENSTROM.